United States Patent
Kwak et al.

(10) Patent No.: US 7,953,042 B2
(45) Date of Patent: May 31, 2011

(54) HANDOVER METHOD AND APPARATUS BETWEEN DIFFERENT SYSTEMS

(75) Inventors: No-Jun Kwak, Seoul (KR); Sung-Ho Choi, Suwon-si (KR); Soeng-Hun Kim, Suwon-si (KR); Kyeong-In Jeong, Hwaseong-si (KR); Eun-Hui Bae, Seoul (KR); Han-Na Lim, Siheung-si (KR); O-Sok Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 11/482,109

(22) Filed: Jul. 7, 2006

(65) Prior Publication Data

US 2007/0036109 A1 Feb. 15, 2007

(30) Foreign Application Priority Data

Jul. 7, 2005 (KR) .................. 10-2005-0061392
Nov. 29, 2005 (KR) .................. 10-2005-0114863

(51) Int. Cl.
*H04W 4/00* (2009.01)
*H04B 7/26* (2006.01)

(52) U.S. Cl. ........ 370/331; 370/328; 370/329; 455/436; 455/444; 455/443; 455/439; 455/442

(58) Field of Classification Search .................. 370/331, 370/342, 401, 329, 465, 332, 335, 338; 455/436, 455/434, 522, 443, 442, 561, 438, 67, 560, 455/444

See application file for complete search history.

(56) References Cited

U.S. PATENT DOCUMENTS 6,771,964 B1 8/2004 Einola et al. .................. 455/437

(Continued)

FOREIGN PATENT DOCUMENTS

RU 2124271 C1 12/1998

(Continued)

OTHER PUBLICATIONS

Technical Specification Group GERAN; Packet Switched Handover for GERAN A/Gb mode; Stage 2; (Release 6) TS 43.129, 3GPP.V2.0.0, Nov. 19, 2004.

*Primary Examiner* — Nick Corsaro
*Assistant Examiner* — Mahendra Patel
(74) *Attorney, Agent, or Firm* — Roylance, Abrams, Berdo & Goodman L.L.P.

(57) ABSTRACT

A method and apparatus performs handover from an OFDM-based E-UMTS system to a CDMA-based UMTS system. A UE in communication with a PDN via the E-UMTS system, measures signal strength of the UMTS system, and sends a measurement report message indicating the measured signal strength to the E-UMTS system. A radio access network (E-RAN) of the E-UMTS system, determines whether to perform handover from the E-UMTS system to the UMTS system based on the measured signal strength. If the handover is to be performed, a core network (E-CN) of the E-UMTS system generates a PDP context and an MM context for the UE in response to a handover request from the E-RAN. The E-CN sets up a data tunnel for the UE to a GGSN of the UMTS system using the PDP/MM context. After setting up the data tunnel, the E-CN sends to the UE a handover command message including information on a radio bearer (RB) to be used by the UE to access the UMTS system. The UE accesses the UMTS system using the RB information. After accessing the UMTS system, the UE forwards user data for the UE via a data transmission path composed of the E-CN, the data tunnel, a SGSN, and a RAN of the UMTS system, between the PDN and the UE.

6 Claims, 15 Drawing Sheets

U.S. PATENT DOCUMENTS

| | | | |
|---|---|---|---|
| 6,836,471 B2 | 12/2004 | Holma et al. | 370/331 |
| 7,079,841 B2 * | 7/2006 | Park | 455/436 |
| 7,403,778 B2 * | 7/2008 | Reynolds | 455/436 |
| 7,660,585 B2 * | 2/2010 | Back et al. | 455/437 |
| 7,769,382 B2 * | 8/2010 | Rasanen | 455/436 |
| 2002/0160785 A1 * | 10/2002 | Ovesjo et al. | 455/453 |
| 2004/0105413 A1 | 6/2004 | Menon et al. | 370/338 |
| 2004/0147262 A1 * | 7/2004 | Lescuyer et al. | 455/434 |
| 2005/0143072 A1 * | 6/2005 | Yoon et al. | 455/436 |
| 2005/0169202 A1 * | 8/2005 | Ratasuk et al. | 370/312 |
| 2006/0039329 A1 * | 2/2006 | Samuel et al. | 370/335 |
| 2006/0148475 A1 * | 7/2006 | Spear et al. | 455/436 |
| 2007/0049280 A1 * | 3/2007 | Sambhwani et al. | 455/442 |
| 2007/0213060 A1 * | 9/2007 | Shaheen | 455/436 |

FOREIGN PATENT DOCUMENTS

| | | |
|---|---|---|
| RU | 2004137498 A | 6/2005 |

* cited by examiner

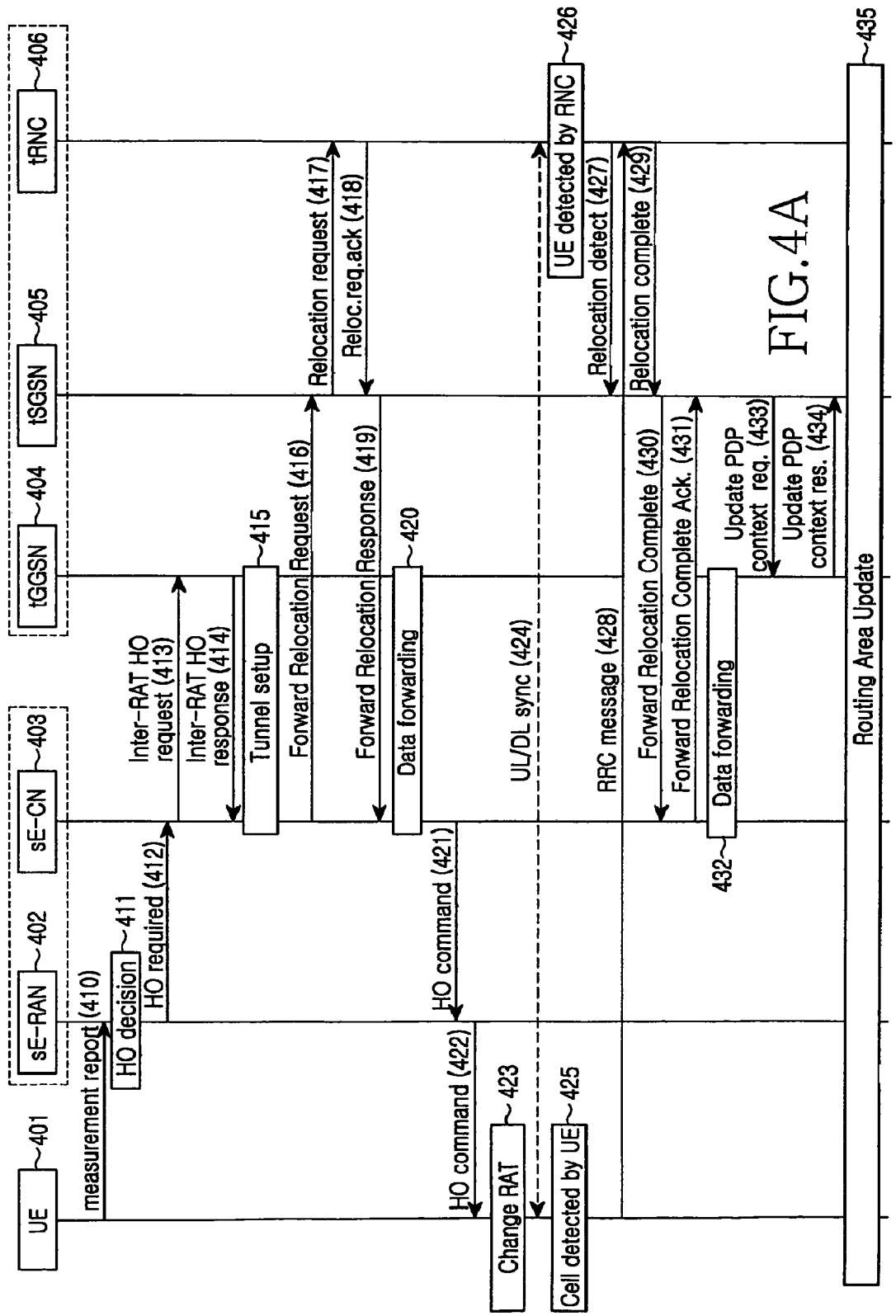

HANDOVER METHOD AND APPARATUS BETWEEN DIFFERENT SYSTEMS

CROSS-REFERENCE TO RELATED PATENT APPLICATIONS

This application claims the benefit under 35 U.S.C. §119 (a) of a Korean patent applications filed in the Korean Intellectual Property Office on Jul. 7, 2005 and assigned Serial No. 2005-61392, and of a Korean patent application filed in the Korean Intellectual Property Office on Nov. 29, 2005 and assigned Serial No. 2005-114863, the entire disclosures of which are hereby incorporated by reference.

BACKGROUND OF THE INVENTION

1. Field of the Invention:

The present invention relates generally to handover between different systems. More particularly, but not exclusively, the present invention relates to a method and apparatus for facilitating handover between a legacy Universal Mobile Telecommunication Service (UMTS) system and an Enhanced UMTS (E-UMTS) system.

2. Description of the Related Art:

A Universal Mobile Telecommunication Service (UMTS) system is the 3rd generation asynchronous mobile communication system that is based on Global System for Mobile Communications (GSM) and General Packet Radio Services (GPRS). A UMTS system uses Wideband Code Division Multiple Access (CDMA) as Radio Access Technology (RAT) and provides coherent service in which users of mobile phones or computers can transmit packet-based text, digitalized audio/video and multimedia data at a rate of 2 Mbps or higher anyplace in the world. The UMTS system employs the virtual access concept called the packet-switched access which uses a packet protocol such as the Internet Protocol (IP), and can always access any terminal in the network.

FIG. 1 illustrates a configuration of a conventional UMTS system.

Referring to FIG. 1, a User Equipment (UE) 110 refers to a terminal device or a user participating in wireless communication, and is wirelessly connected to a Node B 120. The Node B 120, a wireless base transceiver station for directly participating in communication with the UE 110, manages its associated cells. A Radio Network Controller (RNC) 130 controls a plurality of Node Bs and determines whether a need for handover exists. The connection between the RNC 130 and the UE 110 is made by a Radio Resource Control (RRC) interface.

The RNC 130 is connected to a Packet Switched or Packet Service (PS) network, such as the Internet, by a Serving GPRS Support Node (SGSN) 140. The communication between the RNC 130 and the PS network is achieved by Packet Switched Signaling (PS Signaling). The connection between the RNC 130 and the SGSN 140 is called an "Iu-PS interface". The SGSN 140 controls the service provided to each of the subscribers. Typically, the SGSN 140 manages service accounting-related data of each subscriber, and selectively transmits/receives the data to be exchanged with the UE 110 via the Serving RNC (SRNC) 130 that manages the corresponding UE 110.

A Gateway GPRS Support Node (GGSN) 150 serves as a gateway node that allocates an IP address to the UE 110 receiving packet service and connects the UE 110 to an external Packet Data Network (PDN) 160.

As shown in FIG. 1, a combination of the Node B 120 and the RNC 130 is referred to as a Radio Access Network (RAN) 170, and a combination of the SGSN 140 and the GGSN 150 is referred to as a Core Network (CN) 180. Each SGSN 140 and each GGSN 150 is called a CN node.

An E-UMTS system, improved from the CDMA-based UMTS system, employs Orthogonal Frequency Division Modulation (OFDM), and reduces the number of network nodes necessary to connect the UE to the PDN. This facilitates fast data transmission.

FIG. 2 illustrates an exemplary configuration of an E-UMTS system.

Referring to FIG. 2, a UE 210 represents a terminal device or a user. An Enhanced RAN (E-RAN) 240 serves as the Node B 120 and the RNC 130 in the legacy UMTS system. In the E-RAN 240, like in the legacy UMTS system, functions of an E-Node B 220 and an E-RNC 230 may be physically separated in different nodes. Alternatively, functions of an E-Node B 220 and an E-RNC 230 can be integrated in one physical node. An E-CN 250, a combined node of the SGSN 140 and the GGSN 150 in the legacy UMTS system, is situated between a PDN 260 and the E-RAN 240. The E-CN 250 serves as a gateway node for allocating an IP address to the UE 210 and for connecting the UE 210 to the PDN 260.

Service areas of the legacy UMTS system and the E-UMTS system may overlap each other. In the overlapping service area (also known as a handover area), a dual-mode UE capable of receiving signals from both the legacy UMTS system and the E-UMTS system must perform handover between the two systems. To provide services to users via the E-UMTS system, the service provider requires the handover procedure between the legacy UMTS system and the E-UMTS system.

Accordingly, there is a need for an improved system and method of facilitating handover between a legacy Universal Mobile Telecommunication Service (UMTS) system and an Enhanced UMTS (E-UMTS) system.

SUMMARY OF THE INVENTION

An object of the present invention is to address at least the above problems and/or disadvantages and to provide at least the advantages described below. Accordingly, an object of the present invention is to provide a method and apparatus in which a UE in data communication performs handover from an E-UMTS system to a legacy UMTS system.

An exemplary embodiment of the present invention provides a method and apparatus in which a UE in data communication performs handover from a legacy UMTS system to an E-UMTS system.

An exemplary embodiment of the present invention provides a method and apparatus for setting up a tunnel between an E-CN of an E-UMTS system and a CN of a legacy UMTS system. An exemplary embodiment of the present invention also provides packet data service to a UE that performs handover between the E-UMTS system and the legacy UMTS system.

According to one aspect of an exemplary embodiment of the present invention, a method for performing handover from an orthogonal frequency division modulation (OFDM)-based enhanced universal mobile telecommunication service (E-UMTS) system to a code division multiple access (CDMA)-based UMTS system is provided. Signal strength of the UMTS system is measured by a user equipment (UE) in communication with a packet data network (PDN) via the E-UMTS system. A measurement report message indicating the measured signal strength is sent to the E-UMTS system. A radio access network (E-RAN) of the E-UMTS system determines whether to perform handover from the E-UMTS system to the UMTS system based on the measured signal strength. If the handover is determined, a core network (E-CN) of the E-UMTS system sets up a data tunnel for the UE to a Gateway GPRS (General Packet Radio Services) Support Node (GGSN) of the UMTS system in response to a handover request from the E-RAN. After the data tunnel is set up, the E-CN sends a handover command message to the UE. The handover command message includes information on a radio bearer (RB) to be used by the UE to access the UMTS system. The UMTS system is accessed by the UE by using the RB information. After the UMTS system is accessed, the UE forwards user data for the UE via a data transmission path comprised of the E-CN, the data tunnel, the GGSN, a serving GPRS support node (SGSN) of the UMTS system, and the RAN of the UMTS system, between the PDN and the UE.

According to another aspect of an exemplary embodiment of the present invention, a method for performing handover from an orthogonal frequency division modulation (OFDM)-based enhanced universal mobile telecommunication service (E-UMTS) system to a code division multiple access (CDMA)-based UMTS system is provided. Signal strength of the UMTS system is measured by a user equipment (UE) in communication with a packet data network (PDN) via the E-UMTS system and a measurement report message indicating the measured signal strength is sent to the E-UMTS system. A radio access network (E-RAN) of the E-UMTS system determines whether to perform handover from the E-UMTS system to the UMTS system based on the measured signal strength. If the handover is determined, a packet data protocol (PDP) context and a mobility management (MM) context for the UE is generated by a core network (E-CN) of the E-UMTS system in response to a handover request from the E-RAN. The E-CN sets up a data tunnel for the UE to a Gateway GPRS (General Packet Radio Services) Support Node (GGSN) of the UMTS system using the PDP/MM context. After the data tunnel is set up, the E-CN sends a handover command message to the user. The handover command message includes information on a radio bearer (RB) to be used by the UE to access the UMTS system. The UE accesses the UMTS system using the RB information and subsequently forwards user data for the UE via a data transmission path composed of the E-CN, the data tunnel, a serving GPRS support node (SGSN), and a RAN of the UMTS system, between the PDN and the UE.

According to a further aspect of an exemplary embodiment of the present invention, an apparatus for performing handover from an orthogonal frequency division modulation (OFDM)-based enhanced universal mobile telecommunication service (E-UMTS) system to a code division multiple access (CDMA)-based UMTS system is provided. The apparatus comprises a radio access network (E-RAN) of the E-UMTS system which receives a measurement report message indicating signal strength measured for the UMTS system from a user equipment (UE) in communication with a packet data network (PDN) via the E-UMTS system. The E-RAN of the E-UMTS system also determines whether to perform handover from the E-UMTS system to the UMTS system based on the measured signal strength. If the handover is determined, a core network (E-CN) of the E-UMTS system generates a packet data protocol (PDP) context and a mobility management (MM) context for the UE in response to a handover request from the E-RAN. The E-CN of the E-UMTS system also sets up a data tunnel for the UE to a Gateway GPRS (General Packet Radio Services) Support Node (GGSN) of the UMTS system using the PDP/MM context. After the data tunnel is set up, a handover command message including information on a radio bearer (RB) to be used by the UE to access the UMTS system is sent to the UE. After accessing the UMTS system in response to the handover command message, the UE forwards user data for the UE via a data transmission path composed of the E-CN, the data tunnel, a serving GPRS support node (SGSN), and a RAN of the UMTS system, between the PDN and the UE.

According to yet another aspect of an exemplary embodiment of the present invention, a method for performing handover from a code division multiple access (CDMA)-based universal mobile telecommunication service (UMTS) system to an orthogonal frequency division modulation (OFDM)-based enhanced UMTS (E-UMTS) system by a user equipment (UE) is provided. The UE measures signal strength of the E-UMTS system in the course of communicating with a packet data network (PDN) via the E-UMTS system and sends a measurement report message indicating the measured signal strength to the UMTS system. A radio access network (RAN) of the UMTS system determines whether to perform handover from the UMTS system to the E-UMTS system based on the measured signal strength. After the handover is determined, the RAN sends a relocation request message received from a source radio network controller (RNC) to a serving GPRS (General Packet Radio Services) support node (SGSN) of the UMTS system. The SGSN sends a forward relocation request message to a core network (E-CN) of the E-UMTS system in response to the relocation request message. The E-CN sets up a data bearer and a data tunnel for the UE to a radio access network (E-RAN) of the E-UMTS system and a Gateway GPRS (General Packet Radio Services) Support Node (GGSN) of the UMTS system. After the data tunnel is set up, the SGSN sends a relocation command message to the UE via the RAN in response to a request from the E-CN. The UE accesses the E-UMTS system in response to the relocation command message.

Other objects, advantages and salient features of the invention will become apparent to those skilled in the art from the following detailed description which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which:

FIG. 4A is a message flow diagram illustrating a handover process according to a first exemplary embodiment of the present invention;

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
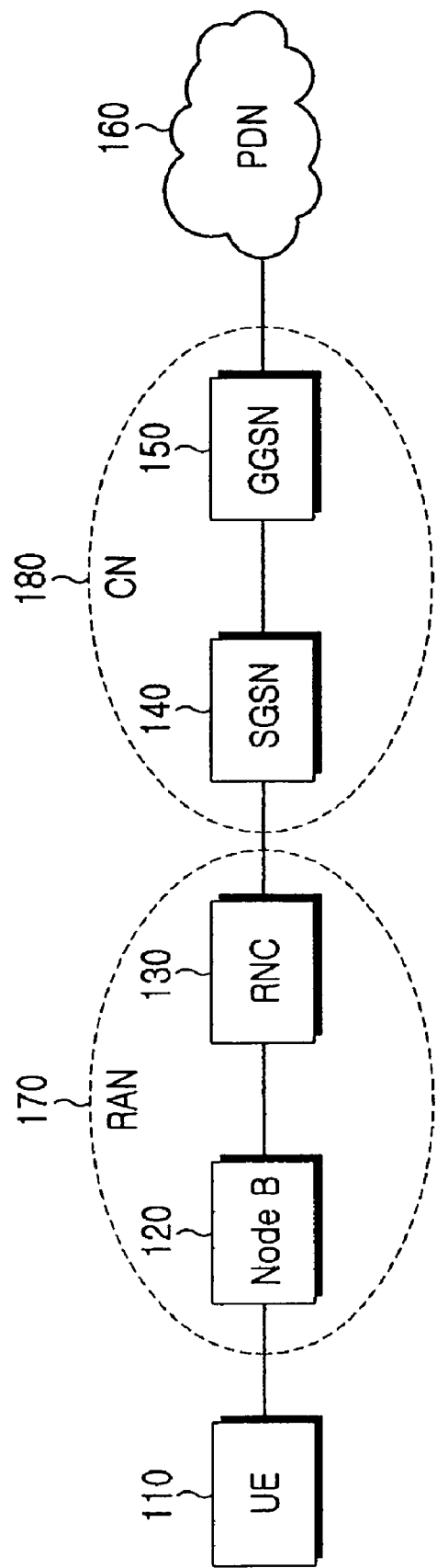
FIG. 1 is a diagram illustrating a configuration of a conventional UMTS system.
Figure 2:
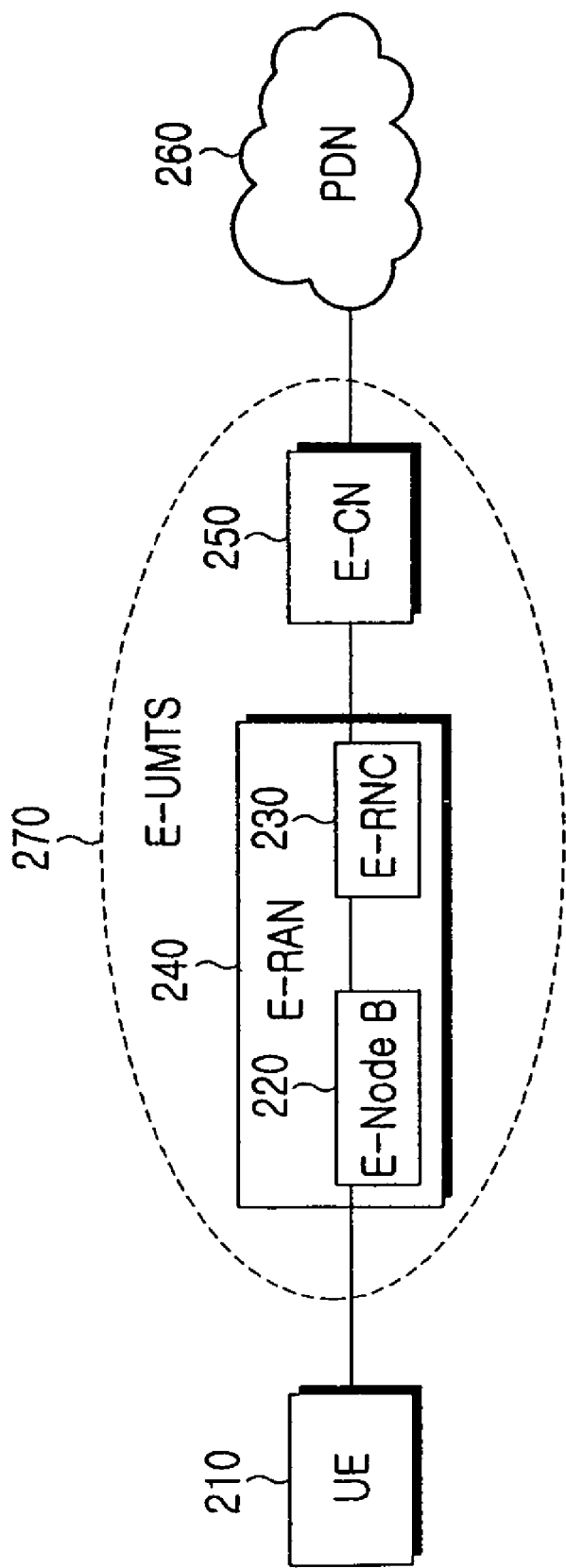
FIG. 2 is a diagram illustrating a conventional configuration of an E-UMTS system.
Figure 3:
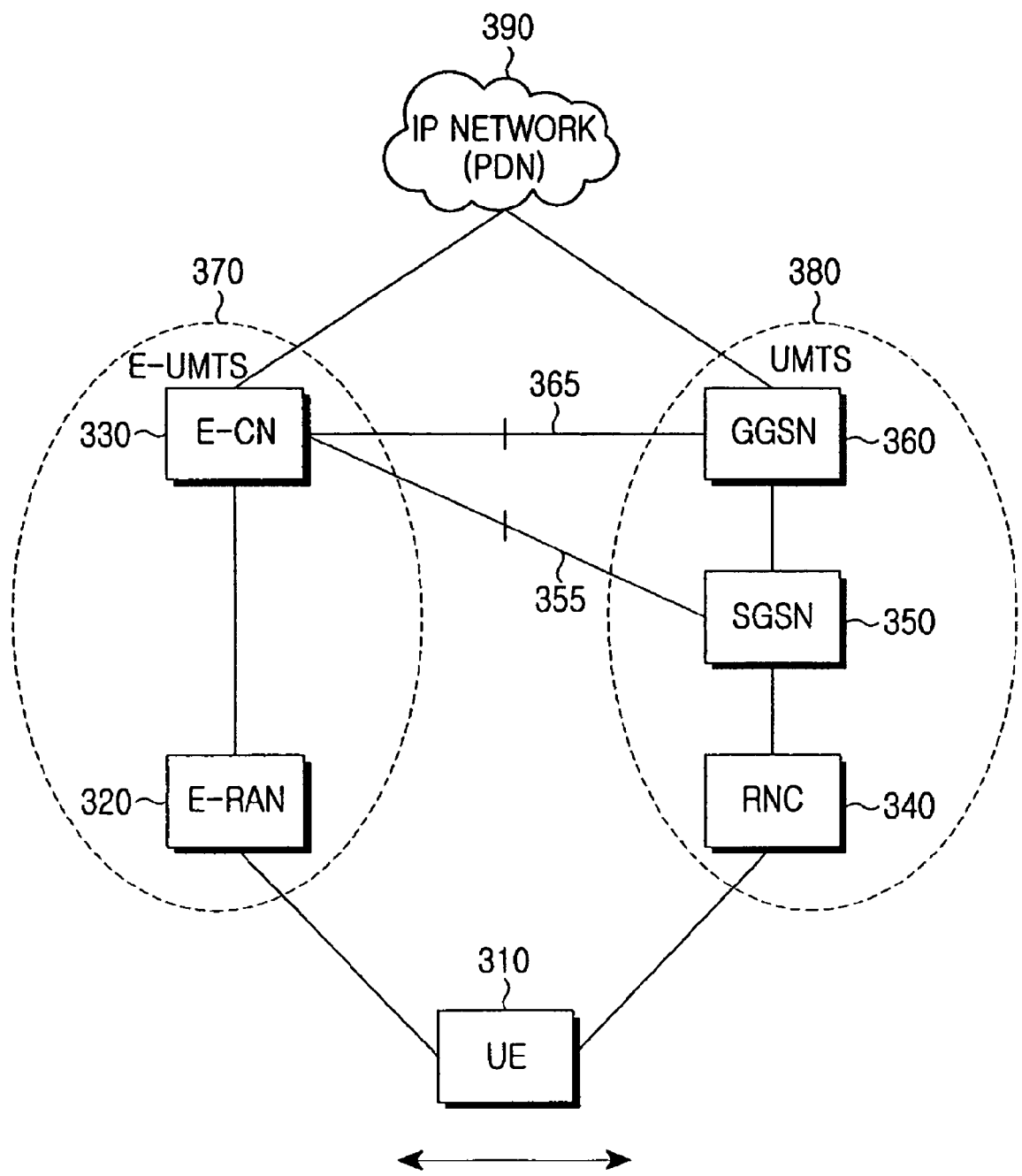
FIG. 3 is a diagram illustrating the nodes participating in a handover procedure from an E-UMTS system to a legacy UMTS system according to an exemplary embodiment of the present invention.

FIG. 3 illustrates the nodes participating in a handover procedure between an E-UMTS system and a legacy UMTS system according to an exemplary embodiment of the present invention.

Referring to FIG. 3, for example, a UE 310, which is connected to an E-UMTS system 370 and is receiving the service provided from a PDN 390 such as the IP network, is now moving to access a UMTS system 380 to receive service therefrom. The UE 310 is moving from the E-UMTS system 370 to the UMTS system 380 in the handover area where it can receive signals from both the E-UMTS system 370 and the UMTS system 380. For example, the forward/reverse transmission path for packet data changes from an old path of UE (310)-E-RAN (320)-E-CN (330)-PDN (390) to a new path of UE (310)-RNC (340)-SGSN (350)-GGSN (360)-PDN (390) or to another new path of UE (310)-RNC (340)-SGSN (350)-E-CN (330)-PDN (390) after the handover.

As another example, the UE 310, which is connected to the UMTS system 380 and is receiving the service provided from the PDN 390, is now moving to access the E-UMTS system 370 to receive service therefrom. Herein, the UE 310 is moving from the UMTS system 380 to the E-UMTS system 370 in the handover area where it can receive signals from both the E-UMTS system 370 and the UMTS system 380. According to an exemplary implementation, the forward/reverse transmission path for packet data changes from an old path of UE (310)-RNC (340)-SGSN (350)-GGSN (360)-PDN (390) to a new path of UE (310)-E-RAN (320)-E-CN (330)-PDN (390) after the handover.

In FIG. 3, Node B(s) between the RNC 340 and the UE 310 in the UMTS system 380, and Node B(s) between the E-RAN 320 and the UE 310 in E-UMTS system 370 are not closely related to an operation of an exemplary embodiment of the present invention. To facilitate heterogeneous handover, the E-CN 330 may have connections 365 and 355 between the GGSN 360 and the SGSN 350.

A first exemplary embodiment of the present invention sets up a tunnel between the E-CN 330 and the GGSN 360 and transmits user data through the tunnel so that the UE 310 may use its old IP address even after the handover. According to the first exemplary embodiment of the present invention, the data transmission path of FIG. 3 is given as PDN (390)-E-CN (330)-GGSN (360)-SGSN (350)-RNC (340)-UE (310) after the handover. Inter-node signaling for handover can advantageously support inter-system handover without modification of the SGSN and the RNC of the legacy UMTS system, by making the best use of the messages for an inter-SGSN Serving Radio Network System (SRNS) relocation procedure defined in the legacy UMTS system.

FIG. 4A illustrates a handover process according to a first exemplary embodiment of the present invention. Herein, the prefixes 's' and 't' attached to a name of each of the nodes indicate Source and Target, respectively.

Referring to FIG. 4A, in step 410, a UE 401 connected to an E-UMTS system measures quality information such as received power level or received signal strength of a UMTS system. The UE 401 sends a Measurement report message including the quality information of the UMTS system to an E-RAN 402. In step 411, the E-RAN 402 determines whether to perform inter-RAT handover. After determining to perform inter-RAT handover, the E-RAN 402 sends a Handover required message to an E-CN 403 in step 412. The Handover required message includes 'Source RNC to Target RNC transparent container' used in an SRNS relocation process of the legacy UMTS system, and a desired target cell ID. That is, the E-RAN 402 configures the 'Source RNC (402) to Target RNC (406) transparent container' such that a target RNC 406 can understand it.

The transparent container is used for inter-SGSN relocation. Even though the transparent container is forwarded from a source RNC to a target RNC via a core network, the core network does not open the container to check its contents. The following information is included in the 'Source RNC to Target RNC transparent container': RRC container, Iu interface's number (for example, '1' indicates Iu-PS), relocation type (always set to UE involved), integrity protection/encryption information, target cell ID, trace recording session info, and Multimedia Broadcast/Multicast Service (MBMS) Linking info. The RRC container may include an RRC message provided from the UE 401, such as a Measurement report message.

In step 413, the E-CN 403 operates as a virtual SGSN by emulating a function of a SGSN and sends an inter-RAT HO request message to a GGSN 404. In step 414, the E-CN 403 receives an inter-RAT HO response message in response thereto. The inter-RAT HO request message includes a packet data protocol context containing service/subscriber information such as IP address and a quality of service (QoS) class allocated to the UE 401 in the E-UMTS system, and a UE-id. In addition, the inter-RAT HO request/response messages include a GGSN address used to set up a User Plane (UP) data tunnel between the E-CN 403 and the GGSN 404. In step 415, a tunnel is established between the E-CN 403 and the GGSN 404 through the information exchanged in steps 413 and 414. If the E-CN 403 is previously aware of the GGSN 404 (for example, there is only one GGSN in the system), steps 413 and 414 may be omitted.

In step 416, the E-CN 403 identifies an SGSN 405 to which a Handover command should be sent, using the target cell ID received in step 412. The E-CN 403 sends a Forward Relocation Request message to the identified SGSN 405. The Forward Relocation Request message includes the transparent container and the target cell ID received in step 412, and a Packet Data Protocol (PDP) context and a Mobility Management (MM) context generated by the E-CN 403. In step 417, the SGSN 405 sends a Relocation request message to an RNC 406. In step 418, the SGSN 405 receives a Relocation request acknowledgement (Ack) message in response to the sent message. In response to the Relocation request message, the RNC 406 allocates resources to the UE 401 and then sends the Relocation request Ack message to the SGSN 405.

In step 419, the SGSN 405 sends a Forward Relocation Response message to the E-CN 403 in response to the Forward Relocation Request message. The Relocation request Ack message and the Forward Relocation Response message include 'TRNC to SRNC transparent container' and Radio Access Bearer (RAB) setup/failed list. The 'TRNC to SRNC transparent container' includes an RRC message in an RRC container. The RAB setup/failed list includes Radio Bearer (RB) information used for an access to the RNC 406. For example, the RAB setup list ('RAB to setup list') includes IDs and QoS information of normally set-up RABs among the RABs requested to be set up, and the RAB failed list ('RAB failed to setup list') includes IDs of RABs failed to be normally set up among the requested RABs. The messages exchanged in steps 416 to 419 may use the intact message formats used in the inter-SGSN SRNS relocation procedure in the legacy UMTS system. Also, steps 413 to 415 and steps 416 to 419 may occur together without order.

If every preparation for handover ends in the UMTS system which is a target system, user data is initially forwarded in step 420 from the E-CN 403 to the GGSN 404 through the tunnel established in step 415. Data forwarding may be initiated in step 420 and in step 432.

In steps 421 and 422, the E-CN 403 forwards a Handover command message to the UE 401 via the E-RAN 402. The Handover command message includes the RB information provided from the UMTS system in step 419. In step 423, upon receipt of the Handover command message, the UE 401 changes the RAT from OFDM to CDMA.

In step 424, the UE 401 performs uplink (UL)/downlink (DL) synchronization with the RNC 406 according to CDMA. If the UE 401 and the RNC 406 detect each other in steps 425 and 426, respectively, then the RNC 406 sends a Relocation detect message indicating the detection of the UE 401 to the SGSN 405 in step 427. If the UE 401 sends an RRC message for requesting RRC connection to the RNC 406 in step 428, the RNC 406 sends a Relocation complete message to the SGSN 405 in step 429. In steps 430 and 431, the SGSN 405 sends a Forward Relocation Complete message to the E-CN 403, and receives a Forward Relocation Complete Ack message in response to the forward relocation complete message.

In step 432, the E-CN 403 may change a data transmission path for the UE 401 so that it includes the GGSN 404 and not the E-RAN 402. In steps 433 and 434, if necessary, the SGSN 405 sends an Update PDP context request message to the GGSN 404, and then receives an Update PDP context response message in response to the Update PDP context request message. Finally, in step 435, a Routing Area Update procedure is performed between the UE 401 and the RNC 406, enabling communication between the UE 401 and the RNC 406.

A second exemplary embodiment of the present invention sets up a tunnel between the E-CN 330 and the SGSN 350 and transmits user data through the tunnel as the E-CN 330 serves as the GGSN 360, so that the UE 310 may use its old IP address even after the handover. Referring to FIG. 3, the data transmission path after the handover, according to the second exemplary embodiment of the present invention, is given as PDN (390)-E-CN (330)-SGSN (350)-RNC (340)-UE (310). Inter-node signaling for handover may advantageously support inter-system handover without modification of the SGSN and the RNC of the legacy UMTS system as the E-CN 330 almost serves as the GGSN 360, by efficiently using the inter-SGSN SRNS relocation procedure defined in the legacy UMTS system.

Figure 4B:
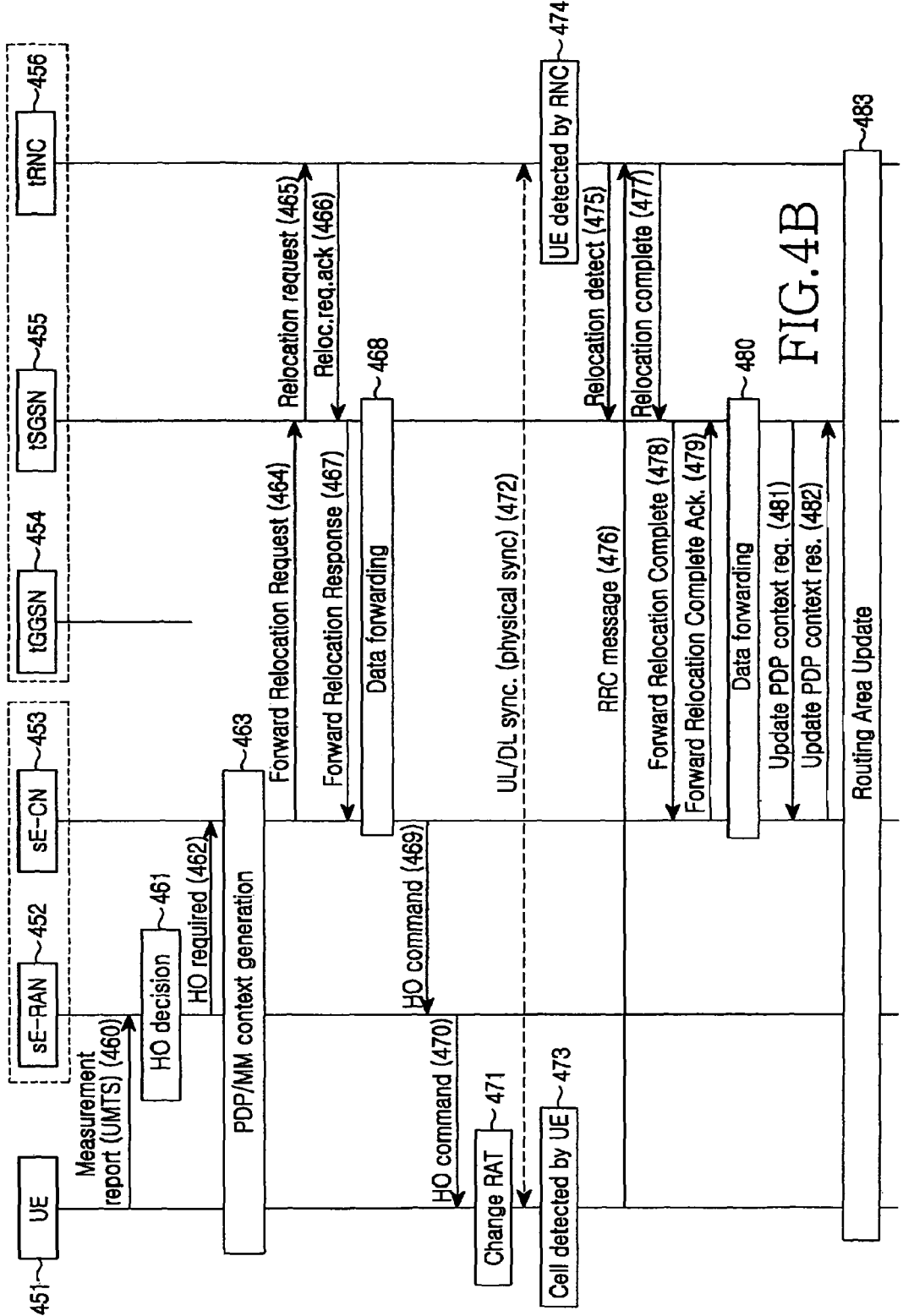
FIG. 4B is a message flow diagram illustrating a handover process according to a second exemplary embodiment of the present invention.

FIG. 4B illustrates a handover process according to a second exemplary embodiment of the present invention. Similarly, the prefixes 's' and 't' attached to the name of each of the nodes indicate Source and Target, respectively.

Referring to FIG. 4B, in step 460, a UE 451 connected to an E-UMTS system measures quality information such as received power level or received signal strength of a UMTS system, and sends a Measurement report message including the quality information for the UMTS system to an E-RAN 452. In step 461, the E-RAN 452 determines whether to perform inter-RAT handover. After determining to perform inter-RAT handover, the E-RAN 452 sends a Handover required message to an E-CN 453 in step 462. The Handover required message includes 'Source RNC to Target RNC transparent container' used in an SRNS relocation process of the legacy UMTS system, and a desired target cell ID. That is, the E-RAN 452 generates the 'Source RNC to Target RNC transparent container' so that a target RNC 456 can understand it, and contains the Measurement report message from the UE 451 in the transparent container.

The transparent container is used for inter-SGSN relocation. Even though the transparent container is forwarded from a source RNC to a target RNC via a core network, the core network does not open the container to check its contents. The following information is included in the 'Source RNC to Target RNC transparent container': RRC container, Iu interface's number (for example, '1' indicates Iu-PS), relocation type (always set to UE involved), integrity protection/encryption information, target cell ID, trace recording session info and Multimedia Broadcast/Multicast Service (MBMS) Linking info.

In step 463, the E-CN 453 generates a PDP context and an MM context, such as, PDP/MM context, associated with the UE 451, in order to operate as a virtual SGSN of the legacy UMTS system. The PDP context includes service/subscriber information such as IP address and a QoS class allocated to the UE 451 in the E-UMTS system. The E-CN 453 can spontaneously generate the MM context and the PDP context. Alternatively, the E-CN 453 can acquire from the UE 451 the information necessary to generate the MM context and the PDP context. In the latter case, the E-CN 453 sends a message for inquiring the information necessary for generating the MM context and the PDP context to the UE 451, and receives a message containing the information necessary for generating the MM context and the PDP context from the UE 451 in response thereto.

In step 464, the E-CN 453 identifies an SGSN 455 to which a Handover command should be sent, using the target cell ID received in step 462, and sends a Forward Relocation Request message to the identified SGSN 455. The Forward Relocation Request message includes the transparent container and the target cell ID received in step 462, together with the PDP context and the MM context generated in step 463. The PDP context includes a GGSN address to facilitate the identification of an appropriate GGSN by the SGSN 455. In an exemplary embodiment of the present invention, the PDP context includes an address of the E-CN 453 as the GGSN address so that the SGSN 455 may recognize the E-CN 453 as a virtual GGSN. In this way, a data tunnel is directly opened between the E-CN 453 and the SGSN 455 without passing through the GGSN 454.

In step 465, the SGSN 455 sends a Relocation request message to an RNC 456. In step 466, in response to the Relocation request message, the RNC 456 allocates resources to the UE 451 and then sends the Relocation request Ack message to the SGSN 455. The Relocation request Ack message includes a 'TRNC to SRNC transparent container'.

In step 467, the SGSN 455 sends a Forward Relocation Response message to the E-CN 453 in response to the Forward Relocation Request message. The Relocation request Ack message and the Forward Relocation Response message include the 'TRNC to SRNC transparent container' and RAB setup/failed list. The RAB setup/failed list includes RB information used access the RNC 456. For example, the RAB setup list includes IDs and QoS information corresponding to normally set-up RABs among the RABs requested to be set up. The RAB failed list includes IDs of RABs failed to be normally set up among the requested RABs. The messages exchanged in steps 464 to 467 may use the intact message formats used in the inter-SGSN SRNS relocation procedure in the legacy UMTS system.

If every preparation for handover ends in the UMTS system which is the target system, user data is initially forwarded in step 468 from the E-CN 453 to the SGSN 455 through the data tunnel set up after step 464. Data may be initially forwarded in step 468 and in step 480.

In steps 469 and 470, the E-CN 453 forwards a Handover command message to the UE 451 via the E-RAN 452. The Handover command message includes the RB information provided from the UMTS system in step 467, and the 'TRNC to SRNC transparent container'. In step 471, upon receipt of the Handover command message, the UE 451 changes the RAT from OFDM to CDMA.

In step 472, the UE 451 performs UL/DL synchronization with the RNC 456 according to CDMA. If the UE 451 and the RNC 456 detect each other in steps 473 and 474, respectively, then the RNC 456 sends a Relocation detect message indicating the detection of the UE 451 to the SGSN 455 in step 475. If the UE 451 sends an RRC message to the RNC 456 according to the information contained in the 'TRNC to SRNC transparent container' in step 476, the RNC 456 sends a Relocation complete message to the SGSN 455 in step 477. In steps 478 and 479, the SGSN 455 sends a Forward Relocation Complete message to the E-CN 453, and receives a Forward Relocation Complete Ack message in response to the Forward Relocation Complete message.

In step 480, the E-CN 453 changes a data transmission path for the UE 451 so that it includes the SGSN 455 and not the E-RAN 452. In steps 481 and 482, if necessary, the SGSN 455 sends an Update PDP context request message to the E-CN 453, and then receives an Update PDP context response message in response to the Update PDP context request message. Finally, in step 483, a Routing Area Update procedure is performed between the UE 451 and the E-CN 453, enabling communication between the UE 451 and the RNC 456.

The foregoing method performs the inter-node signaling for handover without changing IP addresses of UEs 401 and 451 in communication, by efficiently using the inter-SGSN SRNS relocation procedure of the legacy UMTS system. Therefore, the exemplary embodiments of the present invention can use the legacy SGSN and RNC without modification.

Figure 5:
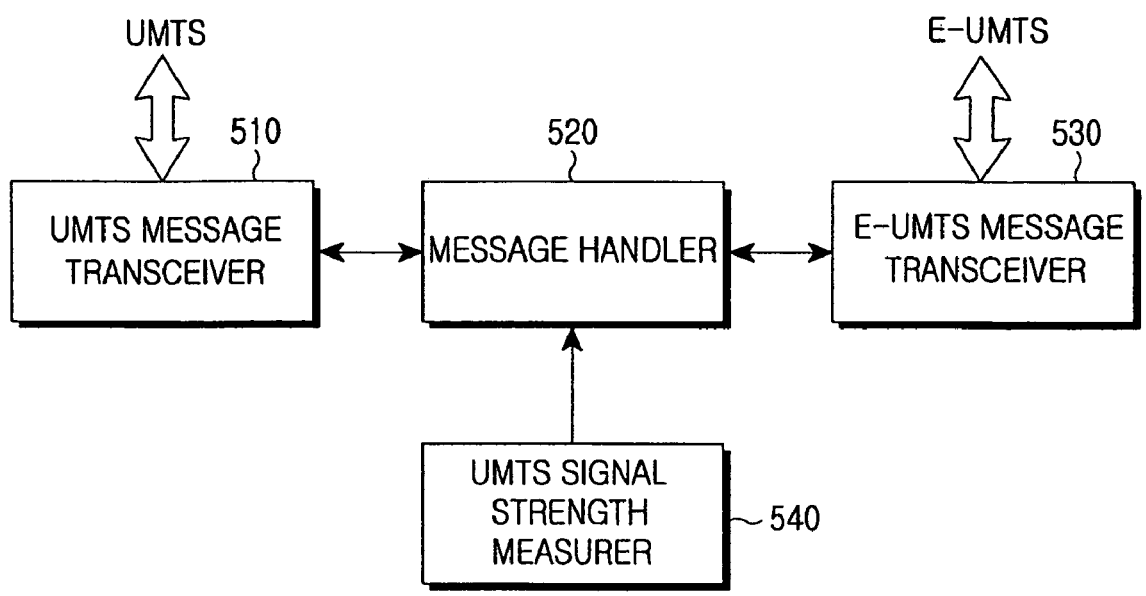
FIG. 5 is a block diagram illustrating a structure of a UE according to the first and second exemplary embodiments of the present invention.

FIG. 5 illustrates a structure of a UE according to the first and second exemplary embodiments of the present invention.

Referring to FIG. 5, reference numerals 510 and 530 represent a UMTS message transceiver and an E-UMTS message transceiver, respectively. The UMTS message transceiver 510 and the E-UMTS message transceiver 530 exchange the messages based on at least one of the exemplary embodiments of the present invention between the UMTS. system and the E-UMTS system. The UMTS message transceiver 510 and the E-UMTS message transceiver 530 are connected to a message handler 520. Although not illustrated, the UMTS message transceiver 510 and the E-UMTS message transceiver 530 communicate with the UMTS system and the E-UMTS system through radio frequency (RF) units capable of processing OFDM signals and CDMA signals in frequency bands of the UMTS system and the E-UMTS system.

The message handler 520 generates messages to be transmitted to the UMTS system and the E-UMTS system, and forwards the generated messages to the UMTS message transceiver 510 and the E-UMTS message transceiver 530. Further, the message handler 520 analyzes the messages received from the UMTS system and the E-UMTS system via the UMTS message transceiver 510 and the E-UMTS message transceiver 530, and performs a necessary operation, especially a handover-related operation. A UMTS signal strength measurer 540 measures strength of the signal received from the currently connected system, such as the UMTS system. If the measured signal strength is higher than or equal to a threshold, the UMTS signal strength measurer 540 provides quality information indicating the measured signal strength to the message handler 520 to enable the start of handover.

Figure 6:
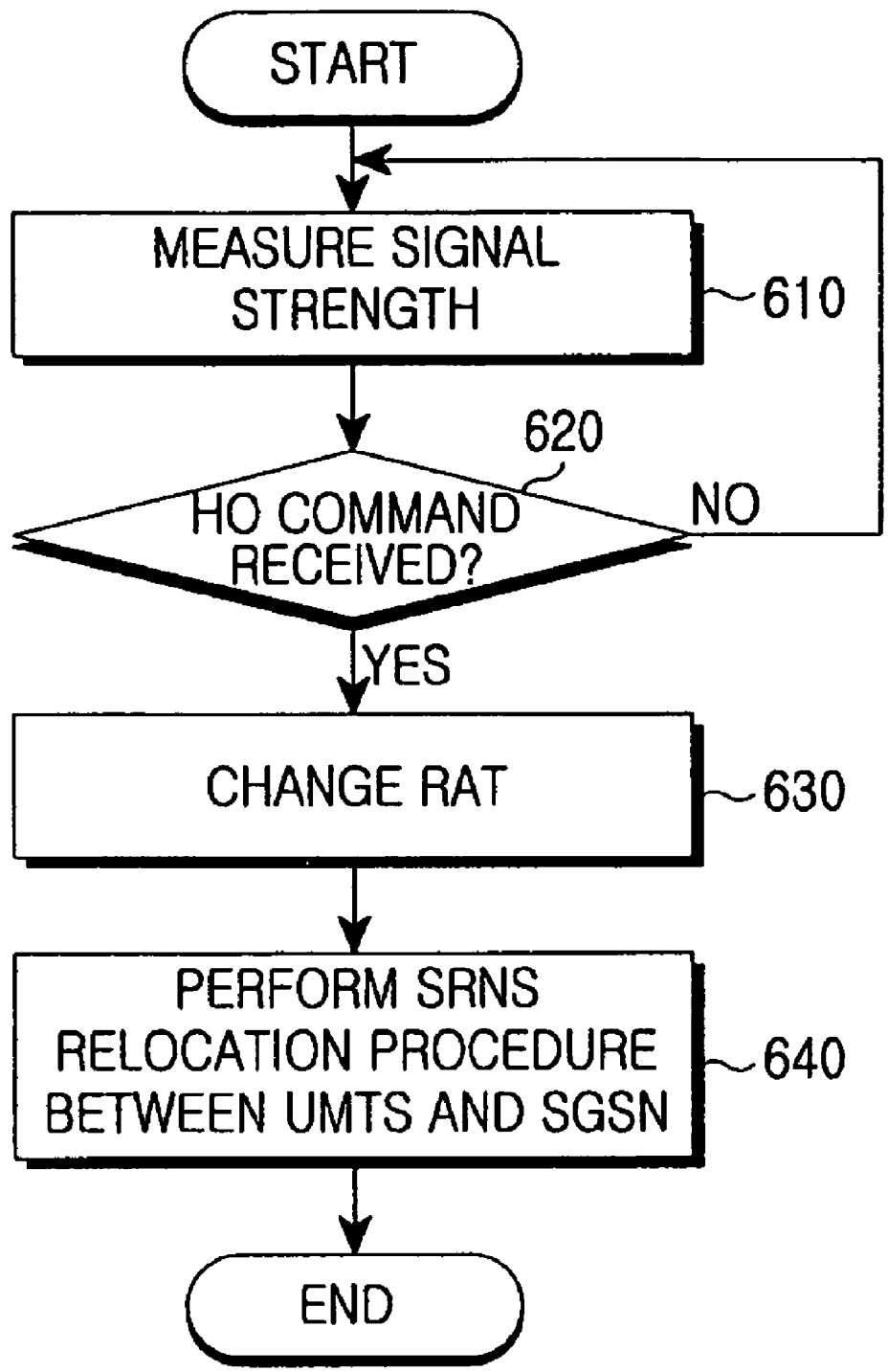
FIG. 6 is a flowchart illustrating an operation of a UE according to the first and second exemplary embodiments of the present invention.

FIG. 6 illustrates an operation of a UE according to the first and second exemplary embodiments of the present invention.

Referring to FIG. 6, in step 610, a UMTS signal measurer 540 measures strength of a signal received from the UMTS system. If the measured signal strength is higher than or equal to a threshold, the UMTS signal measurer 540 provides quality information indicating the measured signal strength to a message handler 520. The message handler 520 generates a Measurement report message (step 410) including the quality information. The Measurement report message is forwarded to the E-UMTS system by an E-UMTS message transceiver 530.

If it is determined in step 620 that the E-UMTS message transceiver 530 receives a Handover command message (step 422), the UE proceeds to step 630. Otherwise, the UE returns to step 610. In step 630, upon receipt of the Handover command message, the UE changes the RAT of its RF unit (not shown) from E-UMTS (OFDM) to UMTS (CDMA). Thereafter, in step 640, the UE performs an inter-SGSN SRNS relocation procedure (steps 424 to 435) with the UMTS system using the message handler 520 and a UMTS message transceiver 510.

Figure 7:
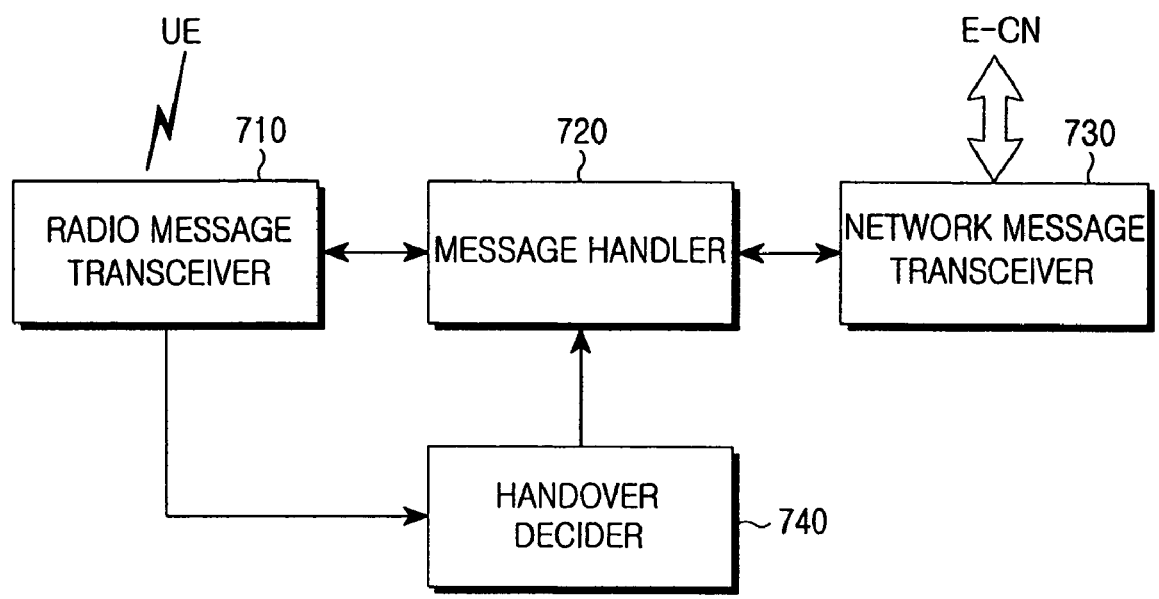
FIG. 7 is a block diagram illustrating a structure of an E-RAN according to the first and second exemplary embodiments of the present invention.

FIG. 7 illustrates a structure of an E-RAN according to the first and second exemplary embodiments of the present invention.

Referring to FIG. 7, a radio message transceiver 710, which handles communication with a UE, receives a Measurement report message (step 410) from the UE, and sends a Handover command message (step 422) to the UE. A handover decider 740 is a unit that determines whether to perform handover of the UE based on quality information included in the Measurement report message provided from the radio message transceiver 710. The handover decider 740 determines whether there is a need for inter-RAT handover taking into account a moving direction of the UE and a load of each cell.

If there is a need for handover, the handover decider 740 sends a notification indicating the need for handover to a message handler 720. The message handler 720 generates messages to be sent to the UE or the E-CN, and analyzes the messages received from the UE or the E-CN. A network message transceiver 730 handles message exchange with the E-CN according to at least one of the exemplary embodiments of the present invention by sending a Handover required message (step 412) to the E-CN and receiving a Handover command message (step 421) from the E-CN.

Figure 8:
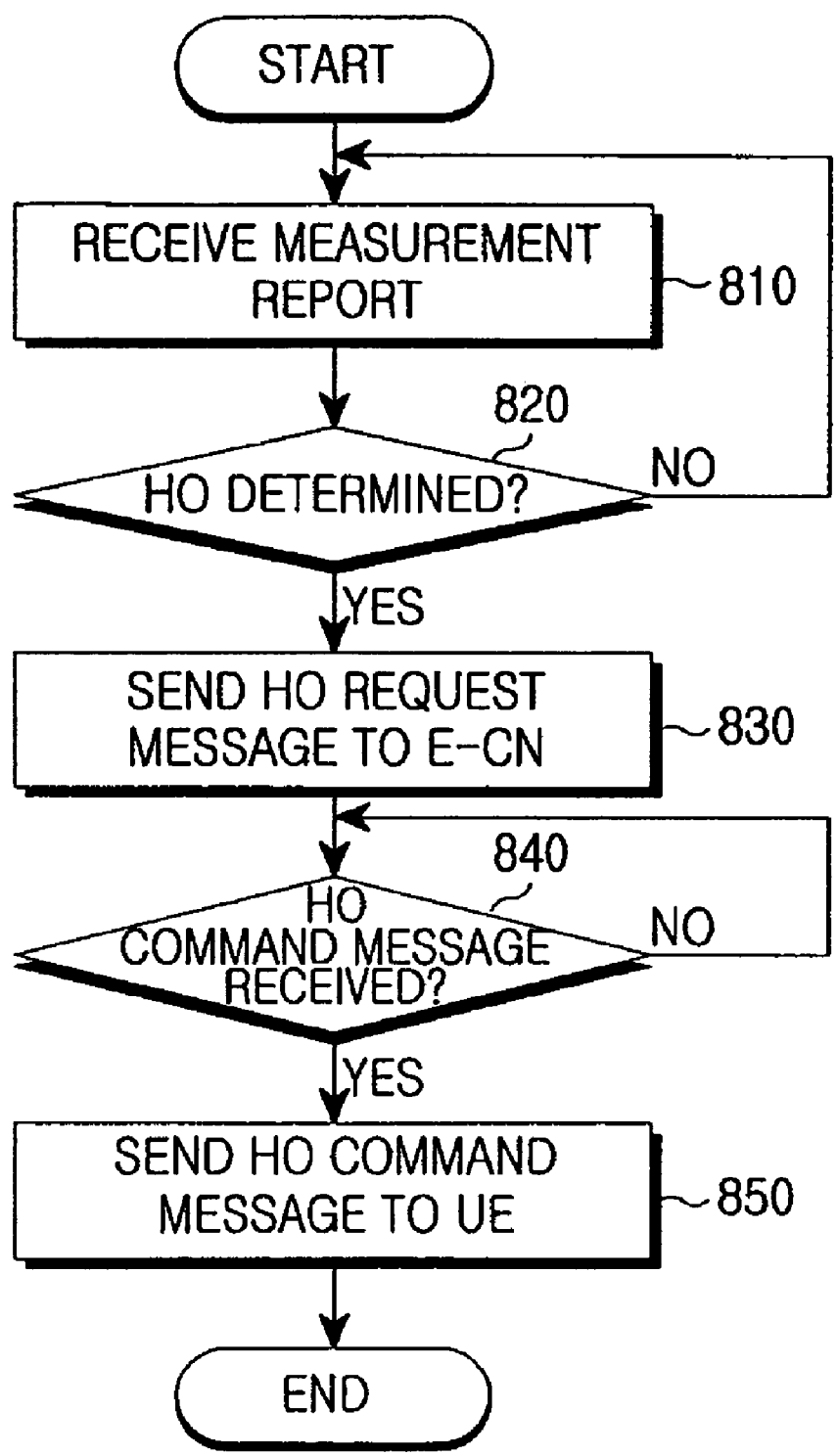
FIG. 8 is a flowchart illustrating an operation of an E-RAN according to the first and second exemplary embodiments of the present invention.

FIG. 8 illustrates an operation of an E-RAN according to the first and second exemplary embodiments of the present invention.

Referring to FIG. 8, in step 810, a radio message transceiver 710 receives a Measurement report message (step 410) from a UE. In step 820, a handover decider 740 determines whether there is a need for inter-RAT handover according to quality information of the UMTS system included in the Measurement report message (step 411). For example, if the signal strength of the UMTS system is higher than or equal to a threshold, the handover decider 740 determines that there is a need for inter-RAT handover.

If it is determined that there is a need for handover, a message handler 720 generates in step 830 a Handover required message (step 412), and the Handover required message is sent to an E-CN by a network message transceiver 730. The Handover required message includes 'Source RNC to Target RNC transparent container'. In step 840, the network message transceiver 730 waits for a Handover command message (step 421) to be received from the E-CN. Upon receipt of the Handover command message in step 840, the message handler 720 generates in step 850 a Handover command message (step 422) to be sent to the UE based on the Handover command message. The generated Handover command message is forwarded to the UE by the radio message transceiver 710.

Figure 9:
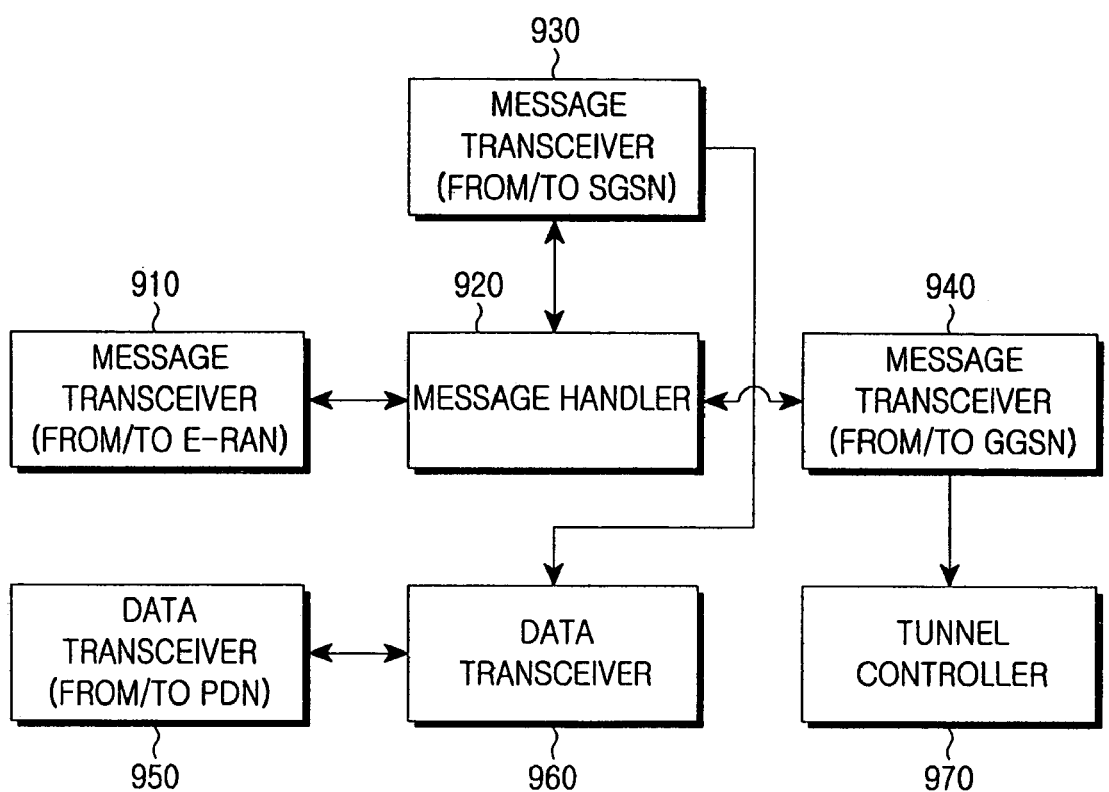
FIG. 9 is a block diagram illustrating a structure of an E-CN according to the first and second exemplary embodiments of the present invention.

FIG. 9 illustrates a structure of an E-CN according to the first and second exemplary embodiments of the present invention.

Referring to FIG. 9, three message transceivers 910, 930 and 940 handle message exchanges with an E-RAN, an SGSN and a GGSN, respectively, and are connected to a message handler 920. The message handler 920 generates messages to be sent from an E-CN to other nodes according to at least one of the exemplary embodiments of the present invention, and analyzes the messages incoming from the other nodes. Data transceivers 950 and 960 each exchange user data with an external network of a PDN and the GGSN.

For example, referring to FIG. 4A, before handover, the E-CN forwards the downlink data received from the PDN via the data transceiver-for-PDN 950, to the E-RAN via a data transceiver-for-E-RAN (not shown). If the message transceiver 940 receives an inter-RAT HO response message (step 414) including GGSN address information from the GGSN, a tunnel controller 970 establishes a tunnel for a user plane using the GGSN address information. As a result, after the handover, data packets can flow along the path of PDN-E-CN-(Tunnel)-GGSN-SGSN-RNC-UE.

Referring to FIG. 4B, before handover, the E-CN forwards the downlink data received from the PDN via the data transceiver-for-PDN 950, to the E-RAN via the data transceiver-for-E-RAN (not shown). After the message transceiver 930 exchanges Forward Relocation Request/Response messages with the SGSN, the tunnel controller 970 establishes a tunnel for a user plane to the SGSN. As a result, after the handover, data packets can flow along the path of PDN-E-CN-(Tunnel)-SGSN-RNC-UE.

Once the data tunnel is established by the tunnel controller 970, the data transceiver 960 transmits the downlink data from the data transceiver 950 to the GGSN or the SGSN.

Figure 10A:
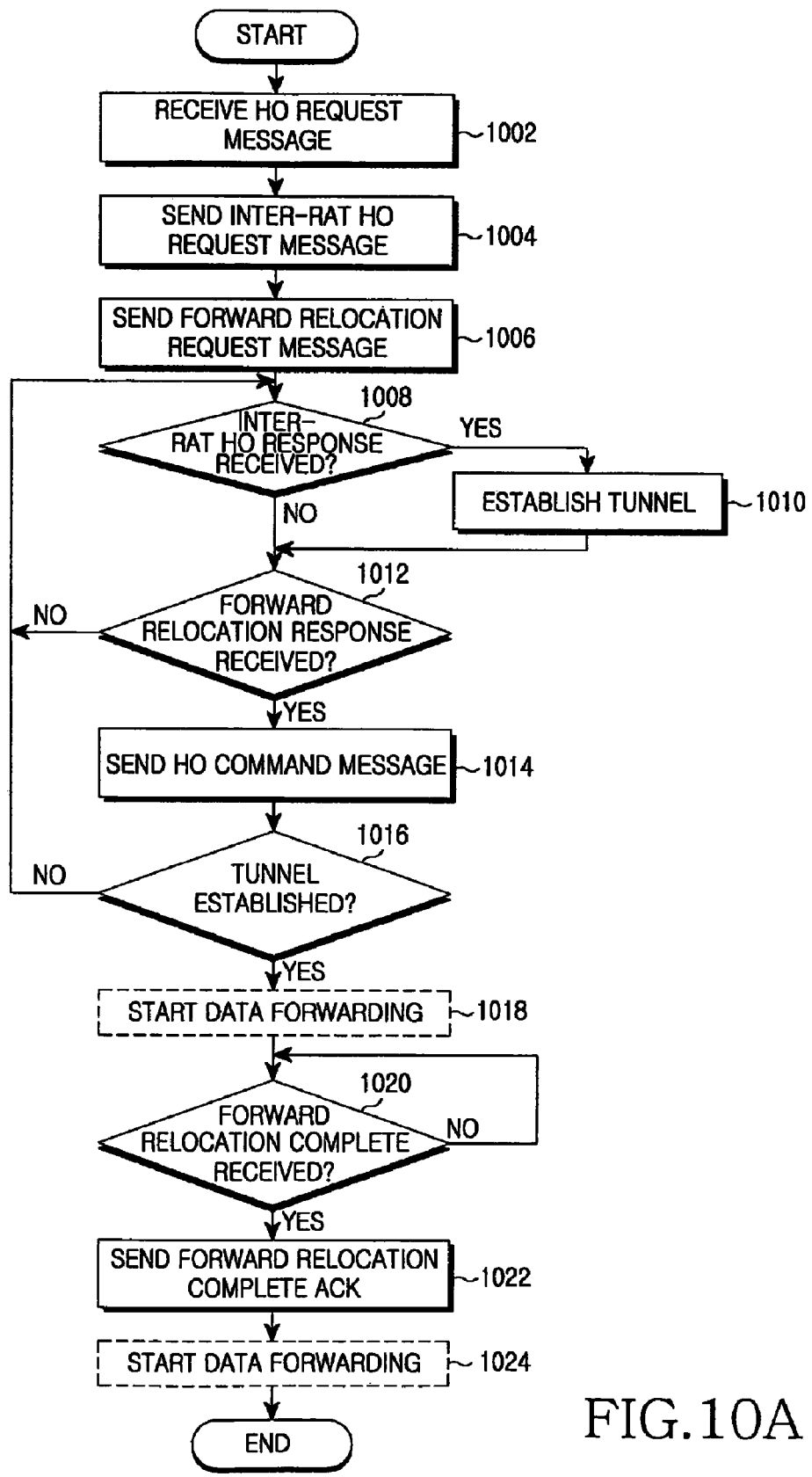
FIG. 10A is a flowchart illustrating an operation of an E-CN according to the first exemplary embodiment of the present invention.

FIG. 10A illustrates an operation of an E-CN according to the first exemplary embodiment of the present invention.

Referring to FIG. 10A, after a message transceiver 910 receives a Handover required message (step 412) from an E-RAN in step 1002, a message handler 920 generates an inter-RAT HO request message (step 413) and the inter-RAT HO request message is sent to a GGSN by a message transceiver 940 in step 1004. The inter-RAT HO request message may include information on the tunnel over which the E-CN will forward user data in the future, and such information as PDP context and UE-id.

In step 1006, a message transceiver 930 sends a Forward Relocation Request message (step 416) generated by the message handler 920 to an SGSN. The Forward Relocation Request message can be equal to the message format used in the inter-SGSN SRNS relocation procedure in the legacy UMTS system. Therefore, the message handler 920 of the E-CN is capable of emulating the message generation function of the SGSN. Herein, steps 1004 and 1006 are replaceable with each other.

After sending the inter-RAT HO request message and the Forward Relocation Request message, the message transceiver 940 waits for an inter-RAT HO response message from the GGSN in response to the inter-RAT HO request message in step 1008, and the message transceiver 930 waits for a Forward Relocation Response message from the SGSN in response to the Forward Relocation Request message in step 1012.

Upon receipt of the inter-RAT HO response message in step 1008, a tunnel controller 970 establishes a tunnel for user plane (i.e. user tunnel) to the GGSN in step 1010. If the Forward Relocation Response message is received in step 1012, the message transceiver 910 forwards a Handover command message generated by the message handler 920 to the E-RAN in step 1014.

After sending the Handover command message to the E-RAN, the E-CN determines in step 1016 whether there is any UE-related tunnel already established to the GGSN. If there is no tunnel to the GGSN, the E-CN returns to step 1008 to wait until the tunnel to the GGSN is set up. However, if there is a tunnel established to the GGSN, the E-CN waits for a Forward Relocation Complete message to be received from the SGSN using the message transceiver 930 in step 1020. Upon receipt of the Forward Relocation Complete message, the message transceiver 930 sends a Forward Relocation Complete Ack message (step 431) generated by the message handler 920 to the SGSN in step 1022. Optionally, the E-CN can start forwarding downlink data via the data tunnel to the GGSN (step 1018) after step 1016, or start forwarding downlink data via the data tunnel to the GGSN (step 1024) after step 1022.

Figure 10B:
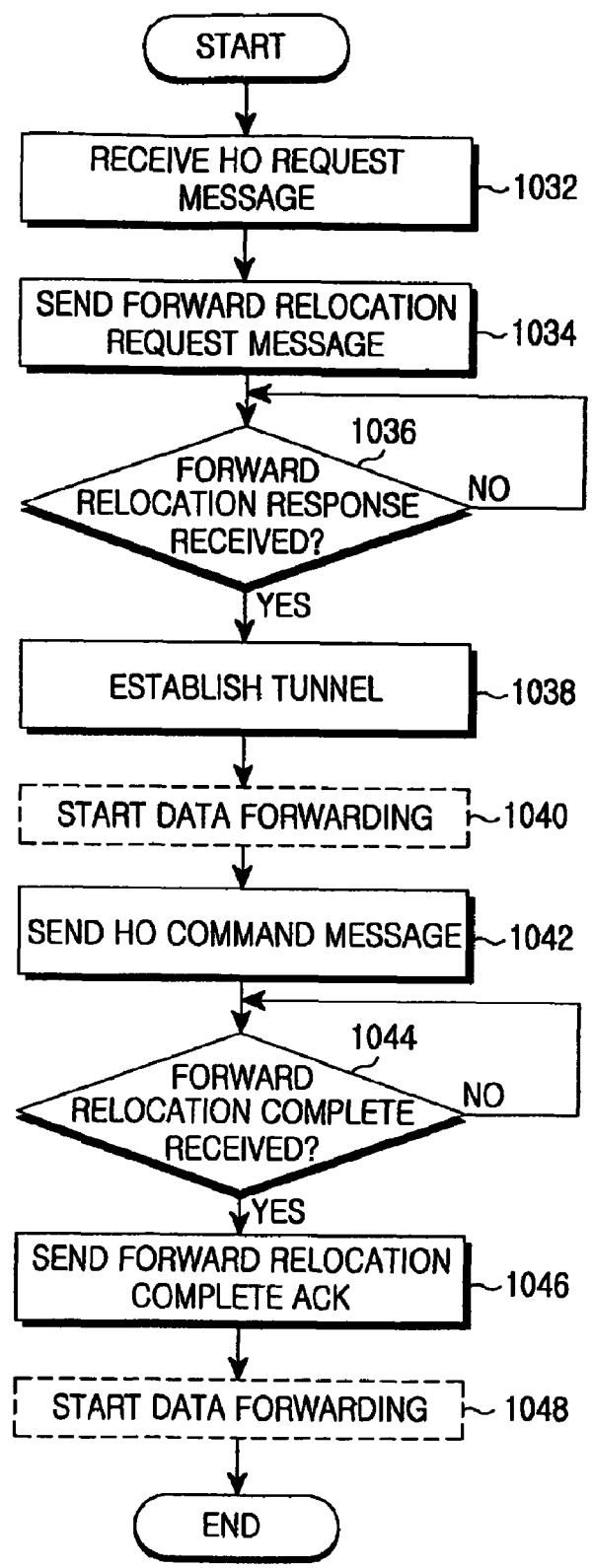
FIG. 10B is a flowchart illustrating an operation of an E-CN according to the second exemplary embodiment of the present invention.

FIG. 10B illustrates an operation of an E-CN according to the second exemplary embodiment of the present invention.

Referring to FIG. 10B, a message transceiver 910 receives a Handover required message (step 452) from an E-RAN in step 1032, and a message transceiver 930 sends a Forward Relocation Request message (step 464) generated by a message handler 920 to an SGSN in step 1034. The Forward Relocation Request message can be equal to the message format used in the inter-SGSN SRNS relocation procedure in the legacy UMTS system. Therefore, the message handler 920 of the E-CN is capable of emulating the message generation function of the SGSN. The Forward Relocation Request message includes a PDP context and an MM context, and the message handler 920 sets a GGSN address included in the PDP context as an E-CN address so that the SGSN may recognize the E-CN as a virtual GGSN.

After sending the Forward Relocation Request message, a message transceiver 940 waits for a Forward Relocation Response message from the SGSN in response to the Forward Relocation Request message in step 1036. Upon receipt of the Forward Relocation Response message, a tunnel controller 970 establishes a tunnel for a user plane to the SGSN in step 1038. In step 1040, the E-CN starts data forwarding to the SGSN. Herein, step 1040 is optional. If the Forwarding Relocation Response message is received in step 1038, the message transceiver 910 forwards a Handover command message generated by the message handler 920 to the E-RAN in step 1042.

After sending the Handover command message to the E-RAN, the E-CN waits for a Forward Relocation Complete message to be received from the SGSN at the message transceiver 930 in step 1044. Upon receipt of the Forward Relocation Complete message, the message transceiver 930 sends a Forward Relocation Complete Ack message (step 431) generated by the message handler 920 to the SGSN in step 1046. The E-CN can forward downlink data via the data tunnel to the SGSN (step 1040) between steps 1038 and 1042, or forward downlink data via the data tunnel to the SGSN (step 1048) after step 1046.

Figure 11:
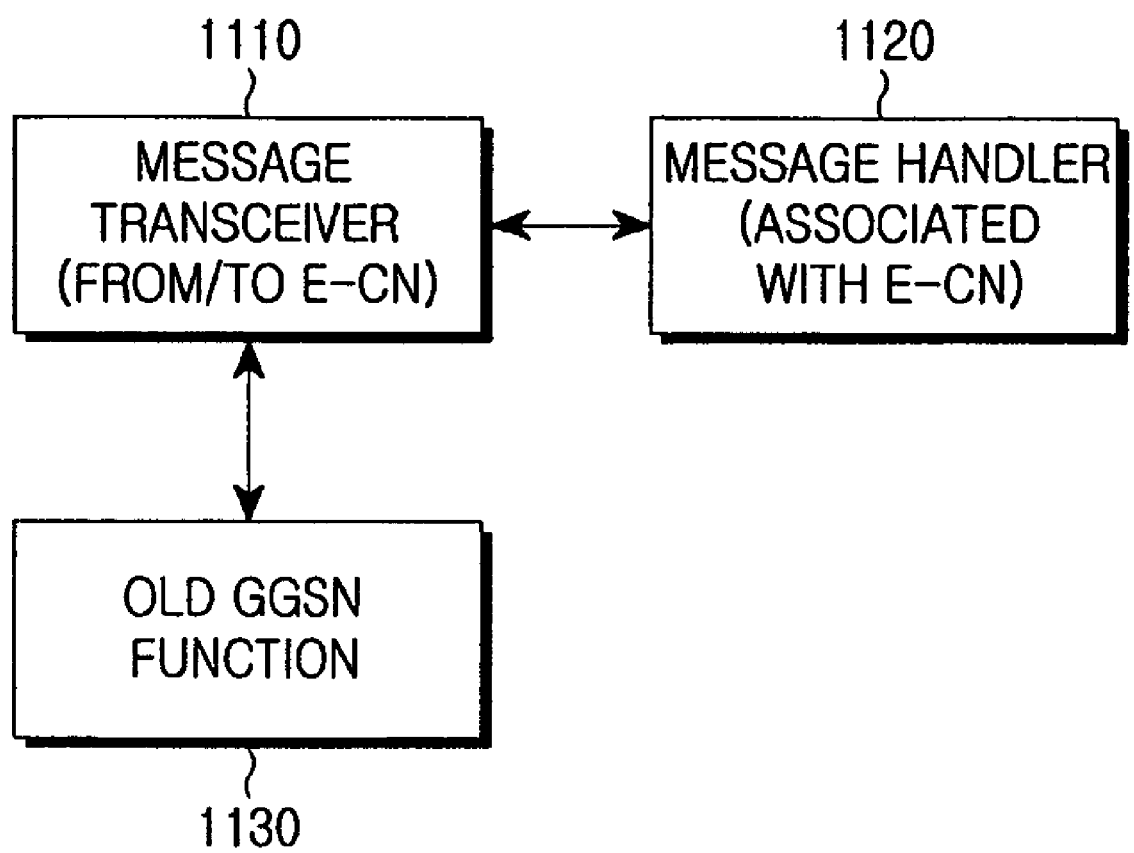
FIG. 11 is a block diagram illustrating a structure of a GGSN according to a preferred exemplary embodiment of the present invention.

FIG. 11 illustrates a structure of a GGSN according to the first and second exemplary embodiments of the present invention. A message handler 1120 handles E-CN related messages according to at least one of the foregoing embodiments, and a message transceiver 1110 exchanges the messages with the E-CN. Reference numeral 1130 represents a legacy GGSN function unit, and the legacy GGSN function unit 1130 serves as a GGSN of the legacy UMTS system. That is, the GGSN according to the exemplary embodiment of the present invention exchanges messages with the E-CN, in addition to the function of the legacy GGSN.

Figure 12:
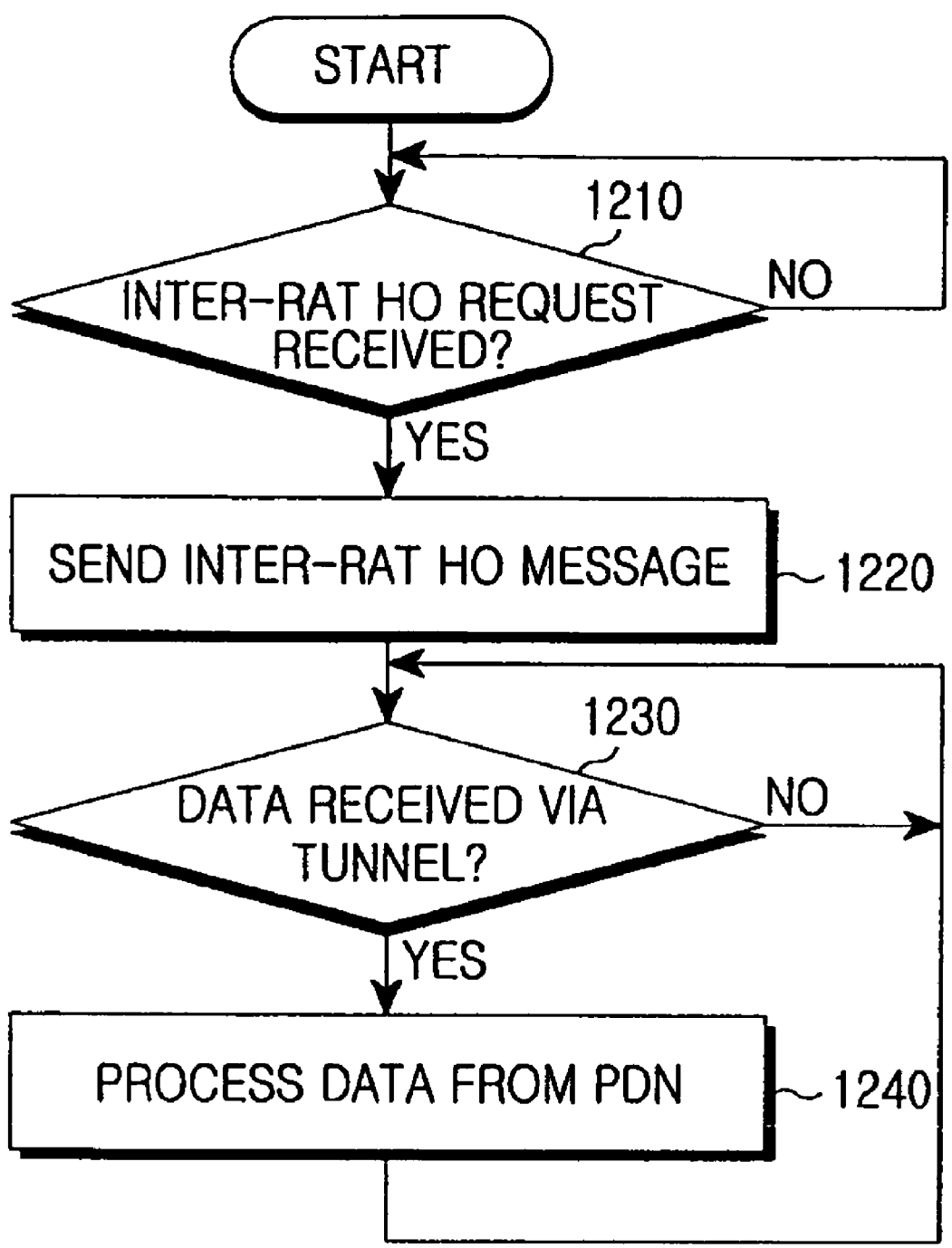
FIG. 12 is a flowchart illustrating an operation of a GGSN according to the first exemplary embodiment of the present invention.

FIG. 12 illustrates an operation of a GGSN according to the first exemplary embodiment of the present invention.

Referring to FIG. 12, upon receipt of an inter-RAT HO request message from an E-CN in step 1210, a message transceiver 1110 sends an inter-RAT HO response message generated by a message handler 1120 to the E-CN in step 1220. The inter-RAT HO response message includes a GGSN address and a port number related to a user tunnel so that the E-CN can establish the user tunnel to the GGSN. If downlink user data is received from the E-CN via the user tunnel in step 1230, a legacy GGSN function unit 1130 handles the downlink user data as data forwarded from the external PDN in step 1240.

A third exemplary embodiment of the present invention is provided for handover from a UMTS system to an E-UMTS system. To allow a UE to use its old IP address even after the handover, an E-CN establishes a data tunnel to an SGSN and transmits user data through the tunnel by performing a function of an SGSN of the legacy UMTS system. Referring to FIG. 3, the data transmission path after the handover according to the third embodiment is given as PDN (390)-GGSN (360)-E-CN (330)-E-RNC (320)-UE (310). Inter-node signaling for handover supports inter-system handover without modification of the GGSN, the SGSN and the RNC of the legacy UMTS system as the E-CN almost perfectly serves as the GGSN, by making the best use of the inter-SGSN SRNS relocation procedure defined in the legacy UMTS system.

Figure 13:
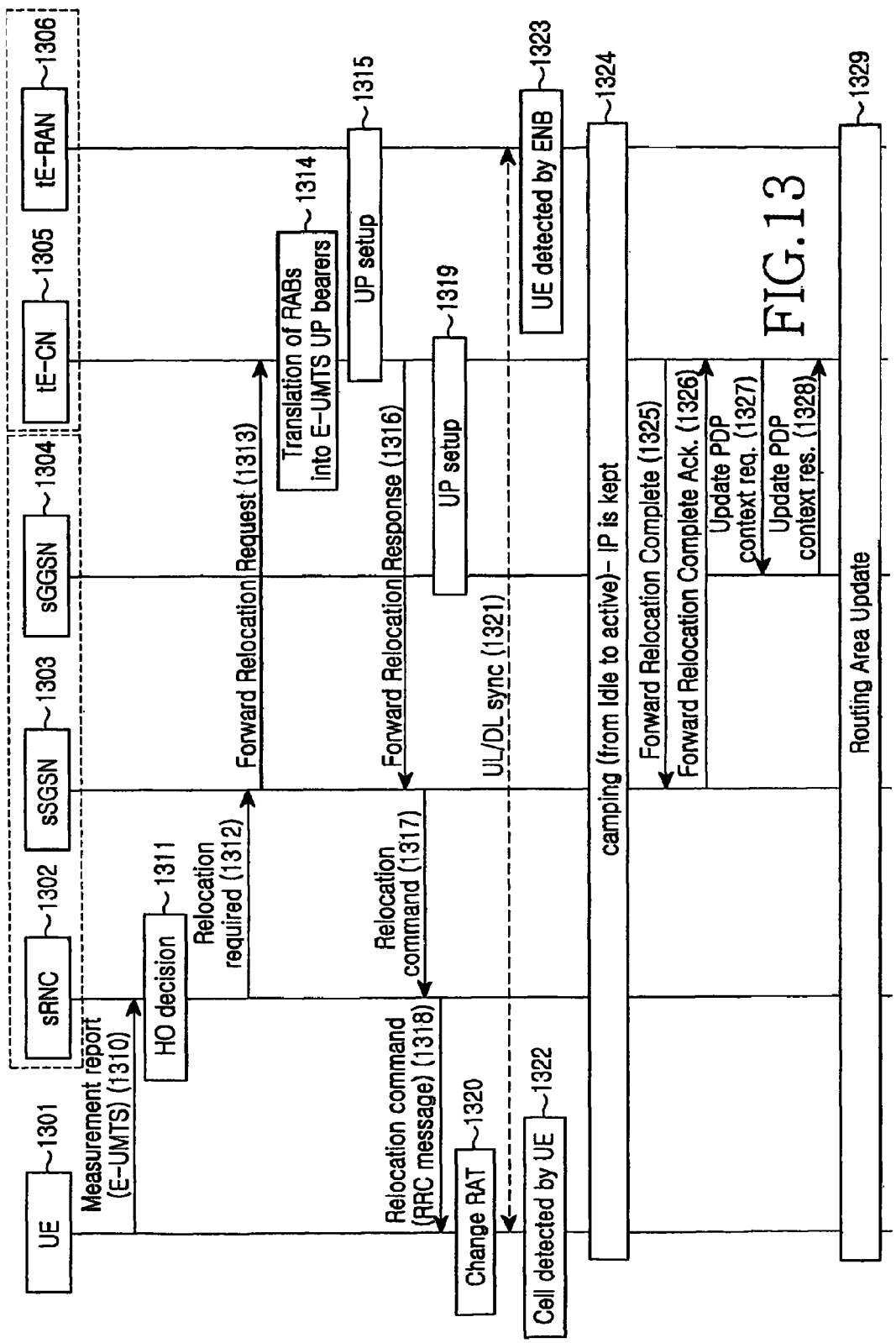
FIG. 13 is a message flow diagram illustrating a handover process according to a third exemplary embodiment of the present invention.

FIG. 13 illustrates a handover process according to the third exemplary embodiment of the present invention. Herein, the prefixes 's' and 't' attached to a name of each of the nodes indicate Source and Target, respectively.

Referring to FIG. 13, in step 1310, a UE 1301 connected to a UMTS system measures quality information such as received power level or received signal strength of an E-UMTS system. The UE 1301 sends a Measurement report message including the quality information of the E-UMTS system to an RNC 1302. In step 1311, the RNC 1302 determines whether to perform handover. After determining to perform handover, the RNC 1302 sends a Relocation required message to an SGSN 1303 in step 1312. The Relocation required message, similar to the handover in the legacy UMTS system, includes a target cell ID and 'Source RNC to Target RNC transparent container'.

In step 1312, the SGSN 1303 determines that it should perform the inter-SGSN SRNS relocation procedure according to the target cell ID included in the Relocation required message. In step 1313, the SGSN 1303 sends a Forward Relocation Request message to an E-CN 1305. The SGSN 1303 sends a Forward Relocation Request message used for the general inter-SGSN SRNC relocation to the E-CN 1305, considering that the E-CN 1305 is another SGSN of the UMTS system. The Forward Relocation Request message includes GGSN address, 'Source RNC to Target RNC transparent container', RAB to setup list, MM context, and PDP context.

In step 1314, the E-CN 1305 reanalyzes RAB information, (i.e., RAB setup list), included in the Forward Relocation Request message as user plane (UP) bearer information used in the E-UMTS system. In step 1315, the E-CN 1305 sets up a UP bearer to an E-RAN 1306. In step 1319, the E-CN 1305 sets up a UP data tunnel to a GGSN 1304 based on the GGSN address included in the Forward Relocation Request message.

At the time of steps 1315 and 1319, the E-CN 1305 sends in step 1316 a Forward Relocation Response message to the SGSN 1303 in response to the Forward Relocation Request message. The Forward Relocation Response message includes 'Target RNC to Source RNC transparent container'. For reference, if possible, the E-CN 1305 perfectly emulates the target SGSN that sends the Forward Relocation Response message in the inter-SGSN SRNS relocation procedure.

In step 1317, the SGSN 1303 sends a Relocation command message to the RNC 1302 in response to the Forward Relocation Response message. In step 1318, the RNC 1302 reads 'TRNC to SRNC transparent container' included in the Relocation command message, and sends an RRC message included in the transparent container to the UE 1301 using a Relocation command message.

In step 1320, the UE 1301 changes RAT from CDMA to OFDM in response to the Relocation command message. In step 1321, the UE 1301 performs UUDL synchronization with the tE-RAN 1306 including the E-RAN. If the UE 1301 and the tE-RAN 1306 detect each other in steps 1322 and 1323, respectively, then the UE 1301 camps in the target cell covered by the E-RAN in step 1324. The following steps 1325 to 1328 provide a process in which the E-CN 1305 emulates the function of the target SGSN in the inter-SGSN SRNS relocation procedure. In steps 1325. and 1326, the E-CN 1305 sends to the source SGSN 1303 a Forward Relocation Complete message indicating the normal completion of the inter-SGSN SRNC relocation, and then receives a Forward Relocation Complete Ack message from the SGSN 1303. In steps 1327 and 1328, if necessary, the E-CN 1305 sends an Update PDP context request message to request the GGSN 1304 to modify its PDP context depending on the possible change in the QoS information, and receives an Update PDP context response message from the GGSN 1304. Finally, in step 1329, a Routing Area Update procedure is performed between the UE 1301, the E-CN 1305 and the GGSN 1304, to enable communication between the UE 1301 and the E-RAN 1306.

After the handover, according to the third exemplary embodiment of the present invention, the data transmission path becomes GGSN-E-CN-E-RNC-UE. The IP address allocated to the UE remains unchanged.

Exemplary embodiments of the present invention provide handover between different systems in a wireless environment. Exemplary embodiments of the present invention enable the handover when a UE moves from an E-UMTS system to a legacy UMTS system, and vice versa. The UE may use its old IP address allocated from the old system during handover between the E-UMTS system and the legacy UMTS system. This eliminates the need for modification of the existing SGSN, RNC and Node B.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing handover from an orthogonal frequency division modulation (OFDM) mobile communication system to a code division multiple access (CDMA)-based UMTS system, the method comprising the steps of:
    measuring, by a user equipment (UE) in communication with a packet data network (PDN) via the OFDM mobile communication system, signal strength of the UMTS system, and sending a measurement report message indicating the measured signal strength to the OFDM mobile communication system;
    determining, by a radio access network (E-RAN) of the OFDM mobile communication system, to perform handover from the OFDM mobile communication system to the UMTS system based on the measured signal strength;
    sending, by the E-RAN, to a Enhanced-Core Network (E-CN) of the OFDM mobile communication a handover required message including a 'source radio network controller (RNC) to target RNC transparent container';
    sending, by the E-CN, to a target serving GPRS support node (SGSN) a forward relocation request message;
    sending, by the target SGSN, to a target radio network controller (RNC) a relocation request message;
    allocating, by the target RNC, a radio bearer (RB) information, and sending the RB information to the E-CN via the target SGSN;
    sending, by the E-CN, to the UE a handover command message including the RB information; and
    accessing, by the UE, the UMTS system using the RB information.

2. The method of claim 1, wherein the forward relocation request message comprises mobility management (MM) context.

3. The method of claim 1, wherein handover command message includes the 'target RNC to source RNC transparent container'.

4. A system for performing handover from an orthogonal frequency division modulation (OFDM) mobile communication system to a code division multiple access (CDMA)-based UMTS system, the method comprising the steps of:
    a user equipment (UE) for measuring in communication with a packet data network (PDN) via the OFDM mobile communication system, signal strength of the UMTS system, and sending a measurement report message indicating the measured signal strength to the OFDM mobile communication system;
    an Enhanced-radio access network (E-RAN) of the OFDM mobile communication system for determining the E-RAN performs handover from the OFDM mobile communication system to the UMTS system based on the measured signal strength, and sending to a Enhanced-Core Network (E-CN) of the OFDM mobile communication a handover required message including a 'source radio network controller (RNC) to target RNC transparent container';
    the E-CN for sending to a target serving GPRS support node (SGSN) a forward relocation request message, and sending to the UE a handover command message including the RB information;
    the target SGSN for sending to a target radio network controller (RNC) a relocation request message;
    the target RNC for allocating a radio bearer (RB) information, and sending the RB information to the E-CN via the target SGSN;
    wherein the UE accesses the UMTS system using the RB information.

5. The system of claim 4, wherein the forward relocation request message comprises mobility management (MM) context.

6. The system of claim 4, wherein handover command message includes the 'target RNC to source RNC transparent container'.

* * * * *